(12) United States Patent
Joshi et al.

(10) Patent No.: US 11,468,223 B2
(45) Date of Patent: Oct. 11, 2022

(54) MODEL DOCUMENTATION GENERATION SYSTEM

(71) Applicant: Wells Fargo Bank, N.A., San Francisco, CA (US)

(72) Inventors: Tarun Joshi, San Francisco, CA (US); Vijayan Nair, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 91 days.

(21) Appl. No.: 16/997,183

(22) Filed: Aug. 19, 2020

(65) Prior Publication Data
US 2022/0058334 A1 Feb. 24, 2022

(51) Int. Cl.
*G06F 40/106* (2020.01)
*G06F 11/36* (2006.01)
*G06F 8/73* (2018.01)

(52) U.S. Cl.
CPC .............. *G06F 40/106* (2020.01); *G06F 8/73* (2013.01); *G06F 11/3692* (2013.01)

(58) Field of Classification Search
CPC ....... G06F 40/106; G06F 8/73; G06F 11/3692
See application file for complete search history.

(56) References Cited

U.S. PATENT DOCUMENTS

| | | | | |
|---|---|---|---|---|
| 7,913,230 B2* | 3/2011 | Vikutan | .............. | G06F 11/3688 717/124 |
| 8,645,244 B2* | 2/2014 | Fanous | ................. | G06Q 10/10 705/35 |
| 9,442,700 B2* | 9/2016 | Sarid | ......................... | G06F 8/30 |
| 2010/0146491 A1* | 6/2010 | Hirano | .................... | G06F 9/454 717/137 |
| 2019/0340518 A1* | 11/2019 | Merrill | ..................... | G06F 40/56 |
| 2021/0133162 A1* | 5/2021 | Arnold | ................... | G06N 20/00 |

* cited by examiner

*Primary Examiner* — Stephen S Hong
*Assistant Examiner* — Nicholas Hasty
(74) *Attorney, Agent, or Firm* — Womble Bond Dickinson (US) LLP

(57) ABSTRACT

Systems, apparatuses, methods, and computer program products are disclosed for at least semi-automated generation of model documentation. In an example embodiment, a template corresponding to a model is selected. User input populating portions of a build notebook is received. The build notebook comprises a model identifier identifying the model and executable code. The build notebook is executed using an execution engine to cause an intermediary file encoded in a type-setting system to be generated. Executing the build notebook causes cross-references of elements of the model documentation to be mapped to appropriate locations within the intermediary file. The elements comprise graphical representations of results of model tests executed on the model and/or extracted or user-defined artifacts required for the model documentation. The intermediary file is executed using a type-setting system compiler to assemble user-provided text and the elements, in accordance with the template, to generate the model documentation.

20 Claims, 7 Drawing Sheets

MODEL DOCUMENTATION GENERATION SYSTEM

TECHNOLOGICAL FIELD

Example embodiments of the present disclosure relate generally to the generation of a model documentation. For example, example embodiments relate to generating a model documentation in an at least partially automated manner.

BACKGROUND

Regulatory bodies/agencies have promulgated rules and regulations for the development and use of models used in various applications. As such, entities that develop and use these models devote significant resources to ensure, for example, that these models meet all necessary standards required by any applicable rules and regulations. In particular, some rules and regulations stipulate that entities that develop and use these models are required to validate the model's processes and show proof thereof. Validation is a process that evidences to the regulatory bodies/agencies that, for example, these entities have developed a model that meets all necessary standards required by any applicable rules and regulations. The result of the validation process is a validation report that can approach one hundred pages in length. The generation of the validation report and other model documentation requires significant resources, for example, in the form of manpower and time.

BRIEF SUMMARY

In various scenarios, quantitative and qualitative models must be validated, for example, for an entity that developed or uses the models to be in compliance with applicable rules and regulations. However, model documentation, such as model validation reports that document the validation of the models, are conventionally generated manually. This manual model documentation generation takes a significant amount of time and manpower and is prone to human error. Moreover, use of manual model documentation generation results in model documentation that cannot be easily regenerated. For example, if a relatively minor change is made in the model, significant reworking of the model documentation may be required. Thus, a technical problem exists in the conventional model documentation (e.g., model validation report) generation.

Various embodiments provide technical solutions to the field of model documentation generation. For example, various embodiments provide methods, systems, apparatus, computer program products, and/or the like for generating model documentation (e.g., a validation report and/or other model documentation). For example, various embodiments provide methods, systems, apparatus, computer program products, and/or the like for generating model documentation in an at least partially automated manner. For example, various embodiments provide solutions developed to systemize, automate, and enhance the generation of model documentations, which will increase speed and consistency of model documentation (e.g., validation report and/or other model documentation) generation, while avoiding human error.

In various embodiments, a model documentation generating tool is provided. For example, the model documentation generating tool may be a validation report generating tool configured and/or programed to generate model validation reports. In an example embodiment, the model documentation generating tool has a model-view-controller framework. In an example embodiment, the model documentation generating tool uses a text-code platform within which executable code may be generated and executed (e.g., to generate results, tables figures and/or text-based descriptions presenting results, and/or text-based descriptions of the model test(s) executed) and text may be generated. In an example embodiment, the text may be markdown text, LaTeX or other type-setting system coded text, and/or other text including one or more tags, executable code elements, and/or the like configured to control various aspects of the display/presentation of the text upon compilation thereof. In an example embodiment, the text-code platform is a Jupyter notebook and/or a project comprising one or more Jupyter notebooks. In various embodiments, the model documentation generating tool may comprise and/or access one or more templates and a portion of the executable code and/or text of the code-text platform may be determined, generated, and/or the like based on the template. In an example embodiment, the executable code of the code-text platform may, when executed, cause one or more model tests (e.g., model validation tests) to be executed and results thereof to be integrated into the resulting model documentation (e.g., model validation report). Thus, various embodiments provide an at least partially automated model documentation generating tool that enables consistent report regeneration while avoiding human error.

Accordingly, the present disclosure sets forth systems, methods, apparatuses, and computer program products that efficiently generate model documentations in a reproducible, at least semi-automated manner. In an example embodiment, a method for generating a model documentation in an at least semi-automated manner is provided. The method comprises receiving, by an interactive user interface (IUI) via input-output circuitry of a user computing device, user input selecting or providing information used to select a template corresponding to a model; and receiving, via the input-output circuitry of the user computing device, user input populating at least a portion of a build notebook. The build notebook comprises (a) a model identifier configured to identify the model and (b) one or more cells of executable code in at least a first programming language. The method further comprises responsive to user input received via the input-output circuitry, executing, via a processor, the build notebook using an execution engine to cause an intermediary file to be generated that is encoded in a type-setting system. Executing the build notebook causes one or more cross-references of elements of the model documentation to be mapped to appropriate locations within the intermediary file. The elements comprise at least one of (a) one or more graphical representations of results of model tests executed on the model or (b) one or more extracted or user-defined artifacts required for the model documentation. The method further comprises executing, via the processor, the intermediary file using a type-setting system compiler to assemble user-provided text and the elements, in accordance with the template to generate the model documentation; and causing the model documentation to be provided via input-output circuitry of the user computing device.

In an example embodiment, the method further comprises at least one of storing the model documentation in a memory of the user computing device or providing the model documentation via a communication circuitry of the user computing device. In an example embodiment, the method further comprises receiving configuration input via user interaction with the input-output circuitry of the user computing device, wherein execution of the build notebook or execution of the intermediary file is performed based at least in part on the configuration input. In an example embodiment, the IUI is provided via execution of a report generating program by the processor and the model documentation generating program has a model-view-controller architecture. In an example embodiment, a model layer of the model-view-controller architecture interfaces with at least one of a database storing information corresponding to the model or a validation test library. In an example embodiment, a view layer of the model-view-controller architecture is configured to generate the build notebook based on the template. In an example embodiment, a controller layer of the model-view-controller architecture comprises the execution engine, the execution engine being configured to cause a model documentation to be generated based on (a) parameters and configuration input, (b) a build notebook generated based on the template, and (c) content of a model layer of the model-view-controller architecture. In an example embodiment, the method comprises generating a database worksheet by querying a database comprising information corresponding to the model and extracting information corresponding to the model from the database to populate one or more fields of the database worksheet. In an example embodiment, execution of the build notebook comprises accessing information corresponding to the model from the database worksheet and generating a graphical representation of information corresponding to the model based thereon. In an example embodiment, the graphical representations of results of model tests executed on the model comprise one or more of graphs, tables, diagrams, or text describing the model tests or the results of the model tests executed on the model. In an example embodiment, the type-setting system compiler is a LaTeX compiler and the intermediary file is a .tex file. In an example embodiment, the build notebook comprises one or more raw cells storing LaTeX-encoded text. In an example embodiment, the template is configured to cause the model documentation to include one or more sections stipulated by rules or regulations corresponding to the model. In an example embodiment, the user input providing information used to select the template corresponding to the model comprises at least one of a model type or the model identifier and the processor automatically selects the template based on the at least one of the model type or the model identifier. In an example embodiment, the IUI is configured to enable incorporation of one or more text functions into the build notebook, the one or more text functions incorporated into a code-text platform providing the IUI as plug-ins. In an example embodiment, the build notebook is generated responsive to a processing of the template. In an example embodiment, the build notebook comprises at least one markdown cell storing markdown text.

According to an aspect, an apparatus for generating a model documentation in an at least semi-automated manner. In an example embodiment, the apparatus comprises processor circuitry configured to control an interactive user interface (IUI) provided via input-output circuitry of the apparatus to receive user input selecting or providing information used to select a template corresponding to a model; control the IUI to receive user input populating at least a portion of a build notebook, the build notebook comprising (a) a model identifier configured to identify the model and (b) one or more cells of executable code in at least a first programming language; responsive to user input received via the input-output circuitry, execute the build notebook using an execution engine to cause an intermediary file to be generated that is encoded in a type-setting system, wherein executing the build notebook causes one or more cross-references of elements of the model documentation to be mapped to appropriate locations within the intermediary file, the elements comprising at least one of (a) one or more graphical representations of results of model tests executed on the model or (b) one or more extracted or user-defined artifacts required for the model documentation; execute the intermediary file using a type-setting system compiler to assemble user-provided text and the elements, in accordance with the template to generate the model documentation; and control the input-output circuitry to provide the model documentation.

In an example embodiment, the processor circuitry is further configured to at least one of store the model documentation in a memory of the user computing device or provide the model documentation via a communication circuitry of the user computing device. In an example embodiment, the processor circuitry is further configured to receive configuration input via user interaction with the input-output circuitry of the user computing device, wherein execution of the build notebook or execution of the intermediary file is performed based at least in part on the configuration input. In an example embodiment, the IUI is provided via execution of a report generating program by the processor and the model documentation generating program has a model-view-controller architecture. In an example embodiment, a model layer of the model-view-controller architecture interfaces with at least one of a database storing information corresponding to the model or a validation test library. In an example embodiment, a view layer of the model-view-controller architecture is configured to generate the build notebook based on the template. In an example embodiment, a controller layer of the model-view-controller architecture comprises the execution engine, the execution engine being configured to cause a model documentation to be generated based on (a) parameters and configuration input, (b) a build notebook generated based on the template, and (c) content of a model layer of the model-view-controller architecture. In an example embodiment, the method comprises generating a database worksheet by querying a database comprising information corresponding to the model and extracting information corresponding to the model from the database to populate one or more fields of the database worksheet. In an example embodiment, execution of the build notebook comprises accessing information corresponding to the model from the database worksheet and generating a graphical representation of information corresponding to the model based thereon. In an example embodiment, the graphical representations of results of model tests executed on the model comprise one or more of graphs, tables, diagrams, or text describing the model tests or the results of the model tests executed on the model. In an example embodiment, the type-setting system compiler is a LaTeX compiler and the intermediary file is a .tex file. In an example embodiment, the build notebook comprises one or more raw cells storing LaTeX-encoded text. In an example embodiment, the template is configured to cause the model documentation to include one or more sections stipulated by rules or regulations corresponding to the model. In an example embodiment, the user input providing information used to select the template corresponding to the model comprises at least one of a model type or the model identifier and the processor automatically selects the template based on the at least one of the model type or the model identifier. In an example embodiment, the IUI is configured to enable incorporation of one or more text functions into the build notebook, the one or more text functions incorporated into a code-text platform providing the IUI as plug-ins. In an example embodiment, the build notebook is generated responsive to a processing of the template. In an example embodiment, the build notebook comprises at least one markdown cell storing markdown text.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Figure 1:
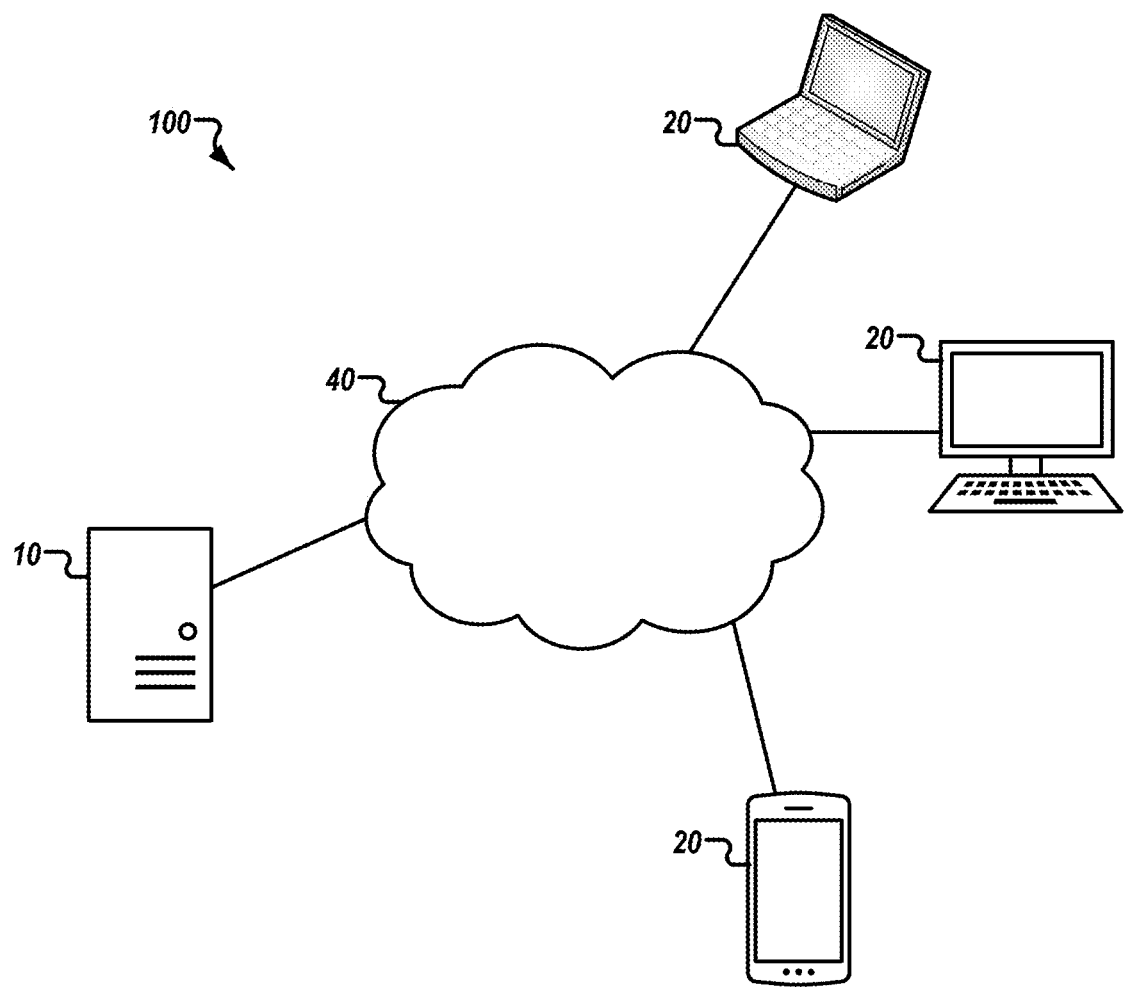
FIG. 1 is a block diagram showing an example architecture of one embodiment described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Where the specification states that a particular component or feature "may," "can," "could," "should," "would," "preferably," "possibly," "typically," "optionally," "for example," "often," "exemplary," or "might" (or other such language) be included or have a characteristic, that particular component or feature is not required to be included or to have the characteristic. Such terminology is intended to convey that the particular component or feature is included in some embodiments while excluded in others, or has the characteristic in some embodiments while lacking the characteristic in others.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Overview

Various embodiments provide methods, systems, apparatuses, and/or computer program products for the efficient and at least partially automated generation and provision of model documentation (e.g., model validation reports and/or other model documentation) for one or more models. In an example embodiment, a model is and/or comprises a mathematical and/or computer-executable model that may be used for data generation, interpolation, and/or extrapolation; prediction generation; and/or data analysis. In various embodiments, the model may be a quantitative model or a qualitative model. In an example embodiment, the model is a financial model and may be used to analyse and/or predict behaviour of capital markets as well as credit and operational risks, and/or another model type. For example, the model may be configured and/or programmed to provide information/data (e.g., predictions, analysis, assessment, and/or the like) that may be used for decision making and/or risk management by various lines of businesses focusing on capital markets, credit markets, internal operations, and/or compliance. As should be understood, the model documentation tool may be used to generate various model documentation (e.g., including but not limited to model validation reports) for a wide variety of qualitative and/or quantitative models that comprise a mathematical and/or computer-executable model that may be used for data generation, interpolation, and/or extrapolation; prediction generation; and/or data analysis.

In various embodiments, the model documentation generated by the model documentation generating tool is a document comprising information/data regarding the generation and/or operation of the model; graphical representations of results (e.g., results, tables figures and/or text-based descriptions presenting results) and/or textual descriptions of various model tests executed based at least in part on the model; and/or other information/data relevant to generation, operation, and/or use of the model. In various embodiments, the model tests may comprise model validation tests and/or other tests configured to test that the model is operating properly, providing reasonable and/or rational results, providing results that are accurate, providing results that are consistent with results from the same model and/or other established models, and/or the like.

In various embodiments, a user may operate a user computing entity to generate a project within a code-text platform. In various embodiments, the code-text platform is configured to contain live code, equations, visualizations and narrative text. The project may comprise and/or be a container containing one or more document fragment files. In various embodiments, the document fragment files may be pages or notebooks of the code-text platform or of other file types (.jpeg image files, .txt text files, .tex LaTeX files, .bib files, and/or the like). In various embodiments, the document fragment files may comprise user and/or automatically generated images, text, markdown text, LaTeX or other type-setting system-encoded text, tables, formatted or unformatted information/data to be incorporated into tables, reference-identifying and/or bibliographic information/data, information/data extracted from documentation corresponding to the model, and/or the like. In various embodiments, the code-text platform may be configured to provide a user interface via which a user may edit, revise, and/or generate executable code and/or text that may be used to generate one or more document fragment files and/or executed during the generation of the validation report. In an example embodiment, the executable code within the code-text platform may be organized into cells and be live code. For example, the execution of the executable code within one or more cells may be performed within the code-text platform. In an example embodiment, the code-text platform is a Jupyter notebook. In an example embodiment, the code-text platform is an enhanced Jupyter notebook configured to provide extended text functions and/or word processing capabilities (e.g., footnotes, spell check, and/or the like). In an example embodiment, the extended text functions and/or word processing capabilities are executed via plug-ins of the code-text platform. In an example embodiment, the model documentation generating tool has a model-view-controller framework. For example, the architecture of the model documentation generating tool may be similar to and/or based at least in part on a model-view-controller framework.

In various embodiments, a user may execute a user computing entity to execute the executable code within the code-text platform to execute one or more model tests based at least in part on the model, generate one or more graphical representations of test results of executing the one or more model tests, and generate and provide a model documentation comprising the one or more graphical representations of test results of executing the one or more model tests. In an example embodiment, the model documentation may comprise portions of text extracted from various documentation documents corresponding to the model and/or user generated text. In various embodiments, the model documentation is a printable and/or displayable computer file. For example, the model documentation may be a portable document format file (pdf) and/or the like.

System Architecture

Example embodiments described herein may be implemented using any of a variety of computing devices or servers. To this end, FIG. 1 illustrates an example environment 100 within which embodiments of the present disclosure may operate to generate model documentation in an at least semi-automated manner. As illustrated, the example environment 100 may include one or more network devices 10 and one or more user computing devices 20. The one or more network devices 10 and/or one or more user computing devices 20 may be in electronic communication with, for example, one another over the same or different wireless or wired networks 40. For example, a user computing device 20 may provide (e.g., transmit, submit, and/or the like) an interactive user interface (IUI) of a code-text platform, receive user input via IUI of the code-text platform, cause the execution of one or more model tests, cause the automated generation of graphical representations of results of executing the one or more model tests and/or textual descriptions of the one or more model tests, and/or cause the at least semi-automated generation of a model documentation corresponding to a model. In various embodiments, the model is stored by a network device 10 and/or the one or more model tests are executed by one or more processors of one or more network devices 10. In various embodiments, the one or more network devices 10 and/or the user computing device 20 communicate via one or more wireless or wired networks 40 such that the model tests are performed and the model documentation is generated and provided via the user computing device 20 and/or stored by the network device 10. For example, a user computing device 20 may provide (e.g., transmit) one or more executable instructions for causing one or more model tests to be performed and/or graphical representations of results of one or more validation tests to be generated via one or more wireless or wired networks 40 such that the network device 10 receives the executable instructions. Processing of the received executable instructions causes the network device 10 to perform the one or more model tests and/or generate the one or more graphical representations and/or text-based description of the one or more model tests, and provide the one or more graphical representations, text-based description, and/or model documentation comprising the one or more graphical representations and/or text-based description via the one or more wireless or wired networks 40 such that the user computing device 20 receives the one or more graphical representations, text-based description, and/or the model documentation.

Figure 2:
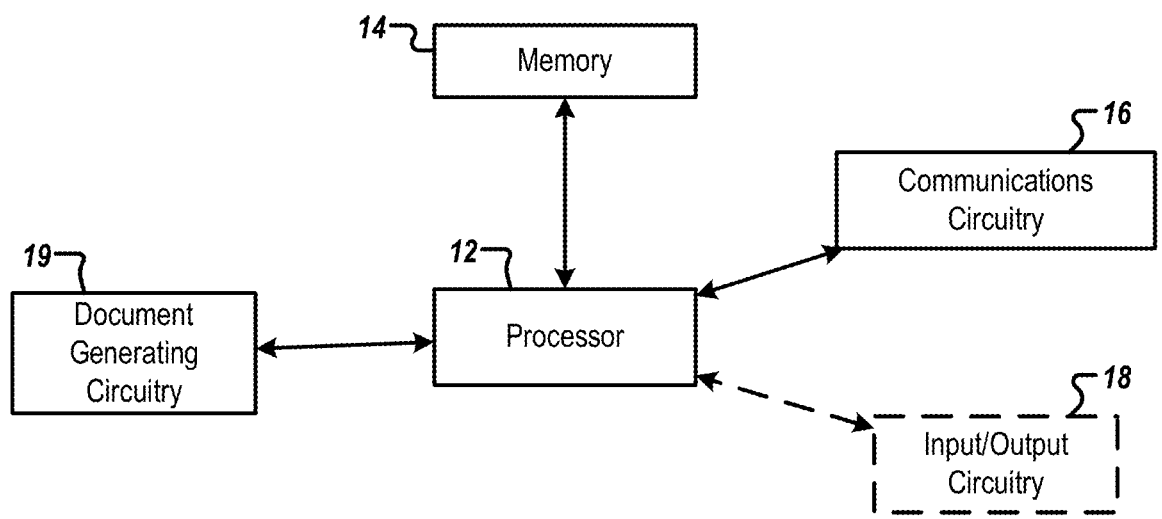
FIG. 2 is a block diagram of a network device that may be specifically configured in accordance with an example embodiment described herein.

The one or more network device 10 may be embodied as one or more servers, such as that described below in connection with FIG. 2. The one or more network devices 10 may further be implemented as local servers, remote servers, cloud-based servers (e.g., cloud utilities), or any combination thereof. The one or more network devices 10 may receive, process, generate, and transmit data, signals, and electronic information to facilitate the operations of the at least semi-automated model documentation generation. In various embodiments, a network device 10 may store and/or be in communication with one or more databases. In an example embodiment, the one or more databases may be embodied as one or more data storage devices, such as a Network Attached Storage (NAS) device or devices, or as one or more separate databases or servers. The one or more databases may store information accessed by the network device 10 to facilitate the operations of executing one or more model tests, generating one or more graphical representations of the results of executing one or more model tests, generating text-based descriptions of the one or more model tests and/or various aspects of the model, and/or at least semi-automatically generating a model documentation comprising the one or more graphical representations and/or text-based descriptions. For example, the one or more databases may store control signals, device characteristics, and access credentials and/or the like for one or more of the user computing devices 20, one or more models, a plurality of templates for generating model documentation and/or graphical representations of results of one or more model tests (e.g., in a database or other data storage), and/or the like. In various embodiments, the graphical representations of the results of executing the one or more model tests may comprise tables, graphs, and/or automatically generated text (e.g., possibly based on an analysis of the results of the one or more model tests and using a natural language processing engine). In an example embodiment, the text-based description of a model test may be at least partially pre-generated and/or at least partly automatically generated using a natural language processing engine, for example.

Figure 3:
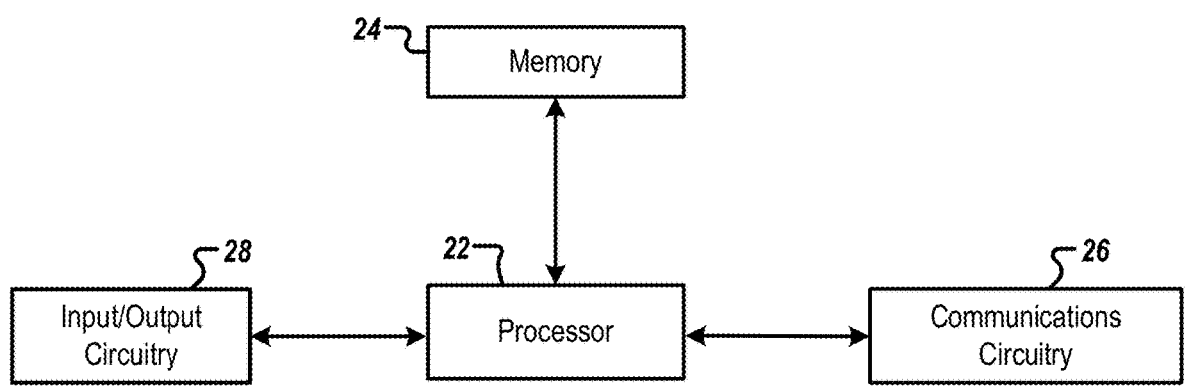
FIG. 3 is a block diagram of a user computing device that may be specifically configured in accordance with an example embodiment described herein.

The one or more user computing devices 20 may be embodied by any computing devices known in the art, such as those described below in connection with FIG. 3. The network device 10 may receive information from, and transmit information to, the one or more user computing devices 20. For example, the network device 10 may receive a trigger for (e.g., executable instructions that when processing cause) executing one or more model tests, generating graphical representations of the results of executing the one or more model tests, generating text-based descriptions of model tests and/or various aspects of the model, and/or at least semi-automatically generating a model documentation comprising the graphical representations and/or text-based descriptions. For example, the trigger received by the network device 10 may be provided by a first user computing device 20. For example, the network device 10 may generate and provide model documentation and/or generated and provide graphical representations and/or text-based descriptions to be included in model documentation such that a user computing device 20 receives the model documentation and/or receives the graphical representations and/or text-based descriptions to be included in model documentation (e.g., for use by a model documentation generating tool for generating model documentation and/or for provision to a human user via an IUI). It will be understood that in some embodiments, the one or more user computing devices 20 need not themselves be independent devices but may be peripheral devices, client devices, and/or the like communicatively coupled to other computing devices.

Exemplary Computing Devices

The network device 10 described with reference to FIG. 1 may be embodied by one or more computing devices or servers, such as the example network device 10 shown in FIG. 2. As illustrated in FIG. 2, the network device 10 may include processing circuitry 12, memory 14, communications circuitry 16, input-output circuitry 18, and document generating circuitry 19, each of which will be described in greater detail below. In some embodiments, the network device 10 may further comprise a bus (not expressly shown in FIG. 2) for passing information between various components of the network device. The network device 10 may be configured to execute various operations described above in connection with FIG. 1 and below in connection with FIGS. 4-7.

In some embodiments, the processor 12 (and/or co-processor or any other processing circuitry assisting or otherwise associated with the processor) may be in communication with the memory 14 via a bus for passing information among components of the apparatus. The processor 12 may be embodied in a number of different ways and may, for example, include one or more processing devices configured to perform independently. Additionally or alternatively, the processor may include one or more processors configured in tandem via a bus to enable independent execution of software instructions, pipelining, and/or multithreading. The use of the terms "processor" or "processing circuitry" may be understood to include a single core processor, a multi-core processor, multiple processors of the network device 10, remote or "cloud" processors, or any combination thereof.

In an example embodiment, the processor 12 may be configured to execute software instructions stored in the memory 14, received from the user computing device 20, or otherwise accessible to the processor. Alternatively or additionally, the processor 12 may be configured to execute hard-coded functionality. As such, whether configured by hardware or software methods, or by a combination of hardware with software, the processor 12 may represent an entity (e.g., physically embodied in circuitry) capable of performing operations according to an embodiment of the present invention while configured accordingly. Alternatively, as another example, when the processor 12 is embodied as an executor of software instructions, the software instructions may specifically configure the processor 12 to perform the algorithms and/or operations described herein when the software instructions are executed.

Memory 14 is non-transitory and may include, for example, one or more volatile and/or non-volatile memories. In other words, for example, the memory 14 may be an electronic storage device (e.g., a computer readable storage medium). The memory 14 may be configured to store information, data, content, applications, software instructions, or the like, for enabling the apparatus to carry out various functions in accordance with example embodiments contemplated herein. For example, in an example embodiment, the memory 14 stores one or more databases. For example, the one or more databases may include a database storing templates for generating model documentations and/or graphical representations of results of one or more model tests, documentation corresponding to one or more models, and/or the like.

The communications circuitry 16 may be any means such as a device or circuitry embodied in either hardware or a combination of hardware and software that is configured to receive and/or transmit data from/to a network and/or any other device, circuitry, or module in communication with the network device 10. In this regard, the communications circuitry 16 may include, for example, a network interface for enabling communications with a wired or wireless communication network. For example, the communications circuitry 16 may include one or more network interface cards, antennas, buses, switches, routers, modems, and supporting hardware and/or software, or any other device suitable for enabling communications via a network 40. Additionally or alternatively, the communication interface 16 may include the circuitry for causing transmission of such signals to a network or to handle receipt of signals received from a network.

In some embodiments, the network device 10 may include input-output circuitry 18 in communication configured to provide output to a user and, in some embodiments, to receive an indication of user input. The input-output circuitry 18 may comprise a user interface, such as a display, and may further comprise the components that govern use of the user interface, such as a web browser, mobile application, dedicated client device, or the like. In some embodiments, the input-output circuitry 18 may additionally or alternatively include a keyboard, a mouse, a touch screen, touch areas, soft keys, a microphone, a speaker, and/or other input-output mechanisms. The input-output circuitry 18 may utilize the processor 12 to control one or more functions of one or more of these user interface elements through software instructions (e.g., application software and/or system software, such as firmware) stored on a memory (e.g., memory 14) accessible to the processor 12.

In addition, the network device 10 further comprises document generating circuitry 19, which includes hardware components designed for executing one or more model tests, generating graphical representations of results of executing the one or more model tests, generating text-based descriptions of the one or more model tests and/or various other aspects of the model, and/or generating, in an at least semi-automated manner, a model documentation comprising the graphical representations. The document generating circuitry 19 may utilize processor 12, memory 14, or any other hardware component included in the network device 10 to perform these operations, as described in connection with FIGS. 4-7 below. The document generating circuitry 19 may further utilize communications circuitry 16 to receive information/data, requests, and/or executable instructions and/or provide model test results, graphical representations of model test results, and/or model documentation (e.g., in response to a request therefor), or may otherwise utilize processor 12 and/or memory 14 to access information/data and/or executable instructions (e.g., software) used to execute one or more model tests, generate graphical representations of the results of executing the one or more model tests, generate text-based descriptions of one or more model tests and/or various aspects of the model, and/or generate a model documentation comprising the graphical representations and provide the results of executing the one or more validation tests, the graphical representations, the text-based descriptions, and/or the model documentation. In an example embodiment, the functionality described herein as being performed by the document generating circuitry 19 is performed through the execution of executable instructions by the processor 12. In an example embodiment, the document circuitry 19 comprises one or more graphical processing units (GPUs).

Although these components 12-19 may in part be described using functional language, it will be understood that the particular implementations necessarily include the use of particular hardware. It should also be understood that certain of these components 12-19 may include similar or common hardware. For example, the document generating circuitry 19 may at times leverage use of the processor 12 or memory 14, but duplicate hardware is not required to facilitate operation of these distinct components of the network device 10 (although duplicated hardware components may be used in some embodiments, such as those in which enhanced parallelism may be desired). The use of the term "circuitry" as used herein with respect to components of the network device 10 therefore shall be interpreted as including the particular hardware configured to perform the functions associated with the particular circuitry described herein. Of course, while the term "circuitry" should be understood broadly to include hardware, in some embodiments, the term "circuitry" may refer also to software instructions that configure the hardware components of the network device 10 to perform their various functions.

To this end, each of the communications circuitry 16, input-output circuitry 18, and document generating circuitry 19 may include one or more dedicated processors, specially configured field programmable gate arrays (FPGA), and/or application specific interface circuit (ASIC) to perform its corresponding functions, these components may additionally or alternatively be implemented using a processor (e.g., processor 12) executing software stored in a memory (e.g., memory 14). In this fashion, the communications circuitry 16, input-output circuitry 18, and document generating circuitry 19 are therefore implemented using special-purpose components implemented purely via hardware design or may utilize hardware components of the network device 10 that execute computer software designed to facilitate performance of the functions of the communications circuitry 16, input-output circuitry 18, and document generating circuitry 19.

The user computing device 20 described with reference to FIG. 1 may be embodied by one or more computing devices, personal computers, desktop computers, client devices (e.g., of the network device 10), and/or mobile devices (laptops, notebooks computers, tablets, smartphones, and/or the like), such as the example user computing device 20 shown in FIG. 3. The illustrated example user computing device 20 includes processing circuitry and/or processor 22, memory 24, communications circuitry 26, and input-output circuitry 28, each of which is configured to be similar to the similarly named components described above in connection with FIG. 2. In various embodiments, the processor 22, memory 24, and input-output circuitry 28 are configured to provide an IUI configured for user interaction (e.g., via the input-output circuitry 28). For example, the IUI may be configured to receive user input initiating the display of an IUI of a code-text platform configured to receive information/data via user interaction with the input-output circuitry 28 to generate a notebook (or project comprising one or more notebooks) that, when executed, causes the generation of a model documentation (e.g., execution of one or more model tests, generation of graphical representations of the results of executing the one or more model tests, generation of text-based descriptions of the model tests and/or various aspects of the model, and/or generation of a model documentation comprising the graphical representations).

In some embodiments, various components of the network device 10 and/or user computing device 20 may be hosted remotely (e.g., by one or more cloud servers) and thus need not physically reside on the corresponding computing device 10, 20. Thus, some or all of the functionality described herein may be provided by third party circuitry. For example, a given computing device 10, 20 may access one or more third party circuitries via any sort of networked connection that facilitates transmission of data and electronic information between the computing device 10, 20 and the third party circuitries. In turn, that computing device 10, 20 may be in remote communication with one or more of the other components describe above as comprising the computing device 10, 20.

As will be appreciated based on this disclosure, example embodiments contemplated herein may be implemented by a network device 10 and/or user computing device 20. Furthermore, embodiments may take the form of a computer program product on at least one non-transitory computer-readable storage medium (e.g., memory 14, 24) storing software instructions. Any suitable non-transitory computer-readable storage medium may be utilized, some examples of which are non-transitory hard disks, CD-ROMs, flash memory, optical storage devices, and magnetic storage devices. It should be appreciated, with respect to certain network devices 10 as described in FIG. 2 or user computing devices 20 as described in FIG. 3, that loading the software instructions onto a computer or apparatus produces a special-purpose machine comprising the means for implementing various functions described herein.

Having described specific components of example network devices 10 and user computing devices 20, example embodiments are described below in connection with a series of flowcharts and other figures.

Example Operation of a Network/User Computing Device

Figure 4:
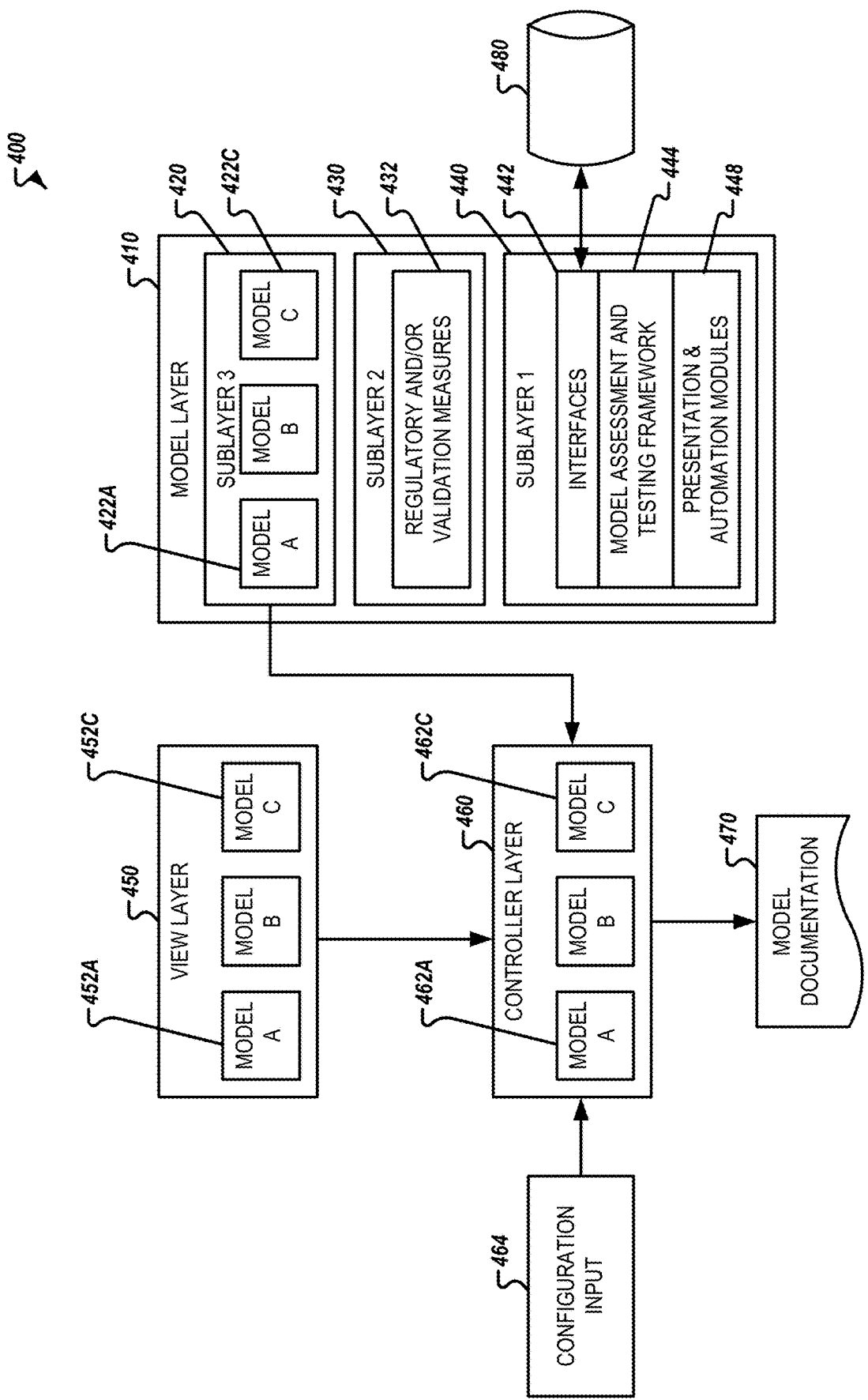
FIG. 4 is a diagram of a framework used for implementing an example embodiment described herein.

FIG. 4 illustrates the architecture of an example embodiment. In the illustrated example architecture, the model documentation generating tool 400 comprises a model layer 410, a view layer 450, and a controller layer 460. The model documentation generating tool 400 may further comprise and/or communicate with one or more databases and/or other data sources 480. In various embodiments, the result of executing the model documentation generating tool 400 based on a project is the generation and provision of the model documentation 470. In various embodiments, the model documentation generating tool 400 may be re-executed on the project to regenerate the model documentation 470. In various embodiments, the model documentation generating tool 400 may be re-executed on the project using a different configuration and/or parameters to generate a model documentation 470 designed for a different audience and/or having a different aesthetic appearance.

In various embodiments, the view layer 450 is configured to generate, store, merge, manage, update, and/or the like project templates 452 (e.g., 452A-452C). In various embodiments, the project templates 452 are generated, merged, updated, and/or the like in accordance with any applicable rules and regulations. For example, the project templates 452 may each be associated with a particular type (e.g., project template 452A may be associated with model type A and project template 452C may be associated with model type C) such that a project template may be used for generating a validation report for models of the particular type. For example, if a rule or regulation indicated that models of a particular type should be evaluated based on a particular test and set of test data, and/or the like, the project template 452 associated with the particular type may comprise executable code to cause the particular test to be executed for the model using the set of test data and cause a description of the test and results of the test to be integrated into the resulting validation report 470. For example, a project template 452 may be configured to cause a validation report 470 generated using the project template 452 to include the sections, information, test results, and/or the like required by applicable rules and regulations for models of the corresponding particular type. In various embodiments, a project template 452 is selected (e.g., via user interaction with a user interface such as input-output circuitry 28 of a user computing entity 20 and/or via an automated selection based on a model type) as part of setting up a project. As document fragment files are generated for the project, each document fragment file is associated with a section of the project template 452. For example, a build notebook file may be generated based on the selected project template 452 and may be populated with the file names and/or paths of the document fragment files to be included within various portions, sections, and/or the like of the model documentation 470. In various embodiments, aspects of the view layer 450 are configured to control which sections are provided in the model documentation 470, specific information/data presentations within various sections of the model documentation 470, and the layout of the model documentation 470 (e.g., the ordering of the sections, and/or the like). For example, processing of a template 452 may cause one or more notebooks (e.g., a build notebook) of a project to be generated such that execution of the project (e.g., the one or more notebooks) causes model documentation to be assembled in accordance with the template.

The model layer 410 is configured to manage, generate, and/or receive content for the model documentation 470. In various embodiments, the model layer 410 comprises a plurality of sublayers. For example, a first sublayer 440 may comprise interfaces 442 (e.g., application programming interfaces (APIs)) configured to communicate with one or more databases 480 and/or other information/data sources. For example, information/data to be included in the model documentation 470 may be extracted and/or accessed from one or more databases 480 or other data sources (e.g., model documentation documents describing, for example, the generation, design, and/or building of the model; rules and/or regulations; results and/or representations thereof from similar models; and/or the like) via one or more interfaces 442. In an example embodiment, the interfaces 442 may also comprise one or more interfaces to a user interface (e.g., an interactive user interface (IUI), graphic user interface (GUI), and/or the like) configured to receive information/data provided by a user through input-output circuitry 28 of user computing device 20. For example, a user may type or otherwise generate content to be included in the model documentation 470 via a user interface and an interface 442 may be used to receive the content from the user interface and provide the content in a manner that the content may be included in one or more document fragments that are identified in the build notebook via an interface 442. In various embodiments, the interfaces 442 may further include interfaces configured to interface with libraries and/or other modules of the model assessment and testing framework 444 and/or presentation and/or automation modules 448. In an example embodiment, the interfaces 442 may comprise application program interfaces (APIs).

The first sublayer 440 may further comprise a model assessment and testing framework 444, presentation and/or automation modules 448, and/or the like. For example, the model assessment and testing framework 444 may be and/or comprise one or more libraries comprising functions, operations, decision making algorithms, and/or the like for use in performing one or more tests of a model and interpreting the results of the model. Some non-limiting examples of model assessment and testing frameworks, for example for capital market-related models, may include numerical frameworks like a Monte Carlo simulation engine, partial differential equation solvers, analytical frameworks to test the theoretical soundness of models, and/or the like. In various embodiments, the presentation and/or automation modules 448 may be configured to generate text, tables, graphs and/or other images, and/or other content based on the results provided by a model and/or the results of one or more tests of the model. For example, the presentation and/or automation modules 448 may comprise modules, computer executable code portions, and/or computer executable instructions for generating images, graphs, tables, and/or data visualizations from results of a test executed on a model and/or other data. For example, the presentation and/or automation modules 448 may generate a graph, a legend for the graph, a caption for the graph, and/or the like. For example, the presentation and/or automation modules 448 may be configured to perform various formatting and/or visualization generation tasks to automate the generation of results, graphical representations of results, text corresponding to results, and/or the like corresponding to one or more tests that may be executed on a model.

In an example embodiment, the model layer 410 comprises a second sublayer 430. In an example embodiment, the second sublayer 430 of the model layer 410 may comprise regulatory and/or validation measure modules 432. For example, the regulatory and/or validation measure modules 432 may comprise various modules, computer executable code portions, computer executable instructions, and/or the like for evaluating pricing measures, risk measures, regulatory compliance, and/or other measures of a model. In various embodiments, the components of the second sublayer 430 may call and/or use components of the first sublayer 440. For example, a regulatory and/or validation measure module 432 may call and/or use an interface 442 to access various information/data from a database 480, cause one or more tests to be executed on the model using a particular data set, cause a particular graphical representation of test results to be generated, and/or the like.

In an example embodiment, the model layer 410 comprises a third sublayer 420. In an example embodiment, the third sublayer 420 comprises model type-specific or model-specific tests 422 (e.g., 422A-422C). For example, models of a particular type may be evaluated based on a particular set of tests using the third sublayer 420. In another example, tests specific to a particular model or model type may be generated and/or executed using the third sublayer 420. In an example embodiment, the third sublayer 420 may call and/or use portions of the second sublayer 430 and/or first sublayer 440. For example, during execution of the model documentation generation tool 400, the third sublayer 420 may be configured to execute one or more tests of the model, possibly using interfaces 442 to components of the second and/or first sub layers 420, 410 to cause various analysis to be performed on the test results and/or graphical representations to be generated.

In various embodiments, the model documentation generation tool 400 comprises a controller layer 460. In an example embodiment, the controller layer 460 is configured to bootstrap and/or orchestrate the at least partial automation of the model documentation generation. In various embodiments, a project is configurable and parameterizable and the controller layer 460 is the portion of the model documentation generation tool 400 that receives and uses the configuration input 464 and parameters 462 provided (e.g., via user interaction with the input-output circuitry 28 of the user computing device 20). For example, the configuration input 464 defines the presentation and the environment corresponding to the model documentation 470. For example, the configuration input 464 isolates the content (e.g., managed via the model layer 410) and the presentation thereof. In an example embodiment, the parameters 462 define the validation tests to be performed. For example, the parameters 462 may indicate a particular type of the model being validated. In an example embodiment, parameters 462 allow for generating different flavors for a model documentation 470. In various embodiments, the configuration input 464 and parameters 462 (e.g., 462A-462C) facilitate the reproducibility of a model documentation 470 and reusability of a project. In an example embodiment, at least one of the parameters 462 are specific to a particular model and/or specific to a particular type of model. For example, the configuration input 464 is configured to define the presentation of content within the IUI code-text platform and/or in the final output model documentation. In an example embodiment, the configuration input is configured to define the file type of the model documentation (e.g., PDF or other file format). In various embodiments, presentation includes the styling of different data fragments like tables, figures, equations, text, and/or the like. Some non-limiting examples of styling includes item (e.g., graph, figure, table, etc.) placement, font type, font size, and/or the like. Content is defined in the code-text platform input and output cells. As described in more detail elsewhere herein, there are different types of input cells such as markdown cells 510, code cells 520, and raw cells 530. The output cells can have different MIME or media types. There are pre-defined presentation templates which will convert the different types of input and output cell contents into the intermediate markup code (for example LaTeX). The configuration input 464 and parameters 462 define the mapping of pre-defined templates to different input and output cells of the code-text platform. Some of these templates may even be parameterized (e.g., based on parameters 462) and be defined in the configuration. In various embodiments, the controller layer 460 is coupled to a user interface (e.g., provided via input-output circuitry 28 of the user computing device 20) such that the controller layer 460 may receive user input (e.g., the configuration input 464) via user interaction with the input-output circuitry 28.

In various embodiments, the view layer 450 is implemented as the code-text platform in which the model document is written. Presentation templates stored, maintained, and/or accessed by the presentation and automation modules 448 map content to presentation. The configuration input 464 defines what presentation templates to use for what type of input-output content. In an example embodiment, the presentation templates are implemented as plug-ins of the code-text platform. The controller layer 460 drives the conversion of the view (e.g., the code-text platform file(s) such as Jupyter notebook(s)) to an intermediate format (e.g., a .TeX file format with LaTeX is the type-setting system used) code by applying the presentation templates (e.g., possibly in the form of plug-ins). The intermediate format is then compiled (e.g., using a type-setting system compiler, such as a LaTeX compiler) to produce the final model documentation (e.g., a PDF file). Parameters to the presentation templates (e.g., plug-ins), can be defined at the configuration layer 460 (such as parameters 462 for generic parameters like ignoring contents of all code cells, for example) or parameters can be defined in metadata for input cells of the code-text platform (e.g., such as a caption for a table or placement of a table).

Figure 5:
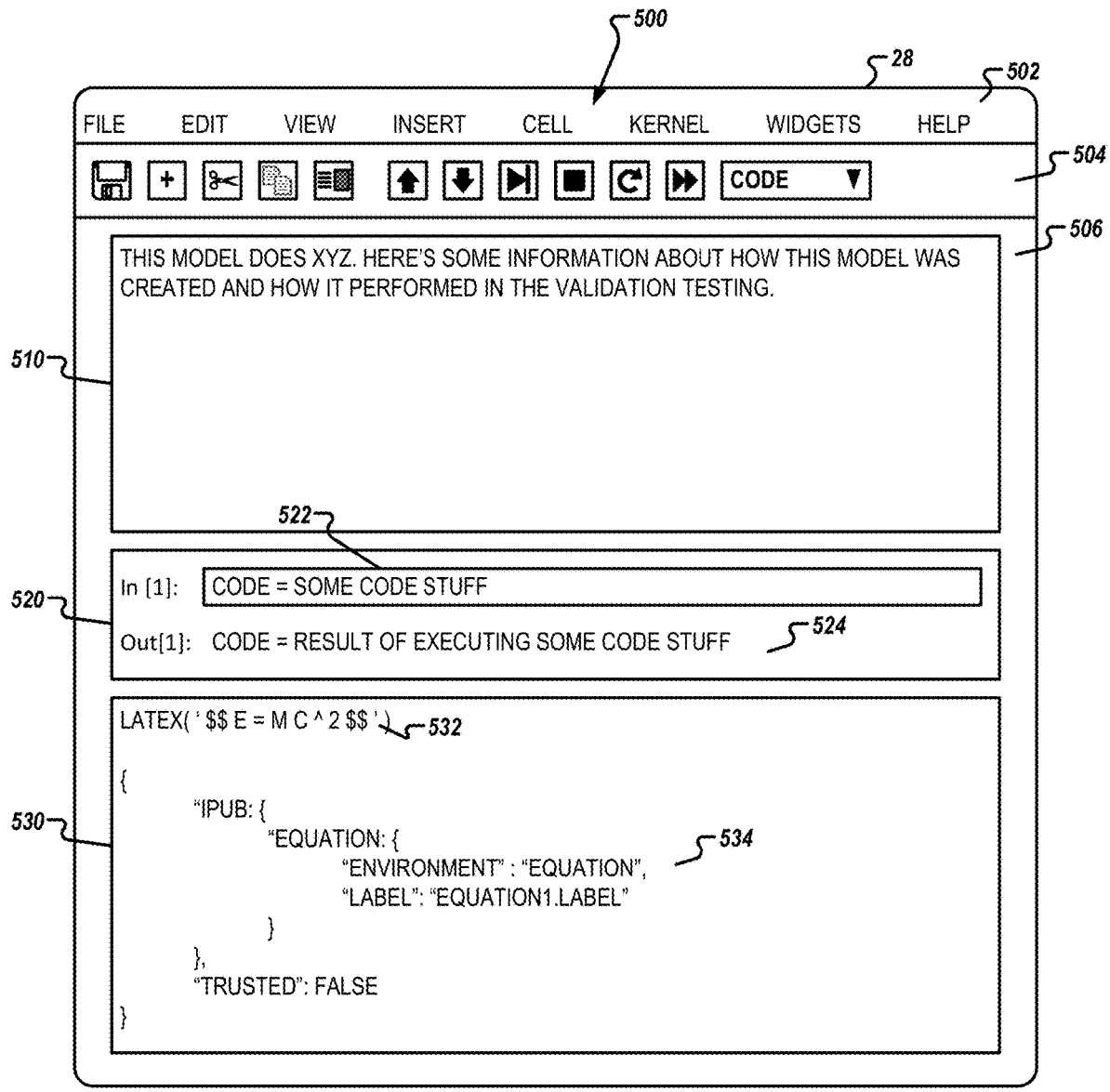
FIG. 5 is an example interactive user interface view in accordance with an example embodiment.

FIG. 5 illustrates an example view of an IUI 500 of the code-text platform used to generate model documentation in an at least semi-automated manner. For example, the IUI 500 may be provided and/or interacted with via the input-output circuitry 28 of the user computing device 20. In various embodiments, the IUI 500 comprises a menu bar 502, a tool bar 504, and a notebook view portion 506. In various embodiments, interaction, via the input-output circuitry 28 of the user computing device 20, with the menu bar 502 provides access to a variety of menus of the IUI 500, including, in an example embodiment, menus corresponding to file options (e.g., save, save as, create new notebook, open, print, etc.), edit options (e.g., copy, cut, paste, etc.), view options (e.g., edit view, preview view, edit-preview view, etc.), insert options, cell options (e.g., new markdown cell, new code cell, new raw cell, duplicate cell, execute cell, execute set of cells, execute all cells, etc.), kernel options, widget options, help options, and/or the like. In various embodiments, interaction, via the input-output circuitry 28 of the user computing device 20, with the tool bar 504 provides one click access to various tools, such as copy, cut, paste, save, new notebook, scroll up, scroll down, execute notebook, stop executing notebook, redo, undo, execute next cell, cell execution options, and/or the like.

In various embodiments, the notebook view portion 506 is configured to be populated with one or more input-output cells (e.g., markdown cell 510, code cell 520, raw cell 530, and/or the like). For example, the IUI 500 provided in FIG. 5 is populated with a markdown cell 510, a code cell 520, and a raw cell 530; however, other various example embodiments may comprise an IUI configured to be populated by a different number and/or different combination of cells and cell classes as to follow a default configuration, a user input configuration, or any other configuration means. In various embodiments, a model documentation may be generated by executing a notebook and/or a project comprising one or more notebooks with a kernel of the code-text platform and via an execution engine of model documentation generation tool 400. In an example embodiment, the controller layer 460 comprises the execution engine. For example, the notebook and/or one or more notebooks of a project may be first executed by a kernel of the code-text platform and the results thereof may be passed to an execution engine of the model documentation generation tool 400 wherein the various content (e.g., results of executing the notebook and/or one or more notebooks of the project; graphical representations of executing one or more model tests; text, tables, and/or figures extracted from documentation corresponding to a model corresponding to the model documentation; and/or the like) maintained by and/or accessed via the model layer 410, may be combined and/or further processed (e.g., by the controller layer 460) to generate the model documentation in accordance with the project template 452, parameters 462, configuration input 464, and/or the like. In various embodiments, executing the notebook and/or one or more notebooks of a project (e.g., via the kernel of the code-text platform and the controller layer 460) causes model documentation to be generated. In various embodiments, the model documentation may be PDF document and/or other printable and/or displayable document format. In an example embodiment, the controller layer 460 may execute the results of executing the notebook and/or one or more notebooks of a project (including any raw cells 530 not executed by the kernel) using a LaTeX or other type-setting system compiler. For example, the controller layer 460 may comprise a LaTeX compiler and/or other type-setting system compiler configured to execute the results of executing the notebook and/or one or more notebooks of the project to generate the model documentation.

In various embodiments, the one or more cells may comprise various classes of cells. For example, the one or more cells may comprise one or more markdown cells 510 configured for receiving, storing, and/or containing markdown text. In various embodiments, the markdown text may be provided via user input (e.g., via input-output circuitry 28), automatically generated and/or populated based on a template 452, automatically generated and/or populated based on information/data extracted from documentation corresponding to a model, automatically generated and/or populated based on an analysis of the results of executing one or more model validation tests on the model, and/or the like. In various embodiments, a markdown cell 510 may be executed by a compiler (e.g., the execution engine and/or a compiler within the code-text platform) associated with a programming language supported by a kernel associated with, supported by, and/or accessible to the code-text platform and/or a type-setting system compiler. In another example, the one or more cells may comprise one or more code cells 520. In various embodiments, a code cell 520 comprises an input portion 522 and an output portion 524. In an example embodiment, the input portion 522 is configured for receiving user input providing executable code in a coding language (e.g., a first programming language such as C++, Python, Java, and/or the like in various embodiments). In various embodiments, the coding language corresponds to at least one kernel associated with, supported by, and/or accessible to the code-text platform. In various embodiments, when the code cell 520 is executed by a compiler (e.g., the execution engine and/or a compiler within the code-text platform) associated with a programming language supported by a kernel associated with, supported by, and/or accessible to the code-text platform), the processor 22 of the user computing entity executes the executable code in the input portion 522 and provides an output and/or result of executing the executable code in the output portion 524 of the code cell 520. In various embodiments, the output portion 524 may include a representation (e.g., that is displayed via the input-output circuitry 28) of the output and/or result of executing the executable code in a first format and an output and/or result of executing the executable code (that is not displayed via the input-output circuitry 28) in a second format. For example, the first format may be HTML and the second format may be a format of the type-setting system (e.g., LaTeX). For example, the second format may include a LaTeX coded version of the output and/or result of executing the executable code. For example, when the input portion 522 of the code cell 520 is executed (e.g., by an execution engine of the controller layer 460) a first format output may be generated for display and, using an API, in an example embodiment, a second format output may be generated for inclusion in the intermediary file (e.g., but not be displayed). In an example embodiment, the one or more cells comprise one or more raw cells 530. In an example embodiment, a raw cell 530 comprises a content portion 532 and a metadata portion 534. In various embodiments, a raw cell 530 is not executed by a kernel of the code-text platform. For example, when a model documentation is generated, a notebook generated using the code-text platform may be executed such that each markdown and/or code cell 510, 520 of the notebook is executed by the kernel of the code-text platform (e.g., the execution engine) and the results thereof (and the raw cells 530 of the notebook) are then executed via the type-setting system compiler of the controller layer 460 of the model documentation generation tool 400. In various embodiments, the content portion 532 of a raw cell 530 may receive, store, and/or contain various types of input. In an example embodiment, the content portion 532 may receive, store, and/or contain LaTeX or other type-setting system input. For example, equations, figures, tables, and/or the like may be defined in the content portion 532 of a raw cell 530. For example, the content portion 532 may contain a text string defining an equation; a pathname and/or file name to a document and/or file containing an equation, figure, and/or table; a text string providing the contents of a table; and/or the like. In various embodiments, the metadata portion 534 of a raw cell 530 is configured to receive, store, and/or contain metadata corresponding to the equation, figure, and/or table defined in the content portion 532 of the raw cell 530. For example, a raw cell 530 may comprise one or more pairs of content portions 532 and corresponding metadata portions 534. For example, the metadata received, stored, and/or contained in the metadata portion 534 of a raw cell 530 may comprise a label, an environment type (e.g., equation, table, figure, and/or the like), a trusted flag, and/or the like corresponding to the content in the content portion 532 of the raw cell 530. In various embodiments, a label defined in the metadata portion 534 of a raw cell 530 may be referred to in a markdown cell 510 to refer to the equation, table, figure, and/or the like defined in the content portion 532 that is paired with metadata portion 534 in raw cell 530. For example, when the content of a markdown cell 510 is executed by the controller layer 460 (e.g., a LaTeX or other type-setting system compiler of the controller layer 460) and identifies a label defined in a raw cell 530 of the notebook, a reference to the content of the raw cell 530 (e.g., defined in the content portion 532) may be inserted in the resulting model documentation. In an example embodiment, the first time (e.g., of a particular execution of a notebook or project comprising one or more notebooks) a markdown cell 510 is executed by the controller layer 460 (e.g., a LaTeX or other type-setting system compiler of the controller layer 460) and that identifies a label defined in a raw cell 530 of the notebook, the content of the raw cell 530 (e.g., defined in the content portion 532) may be inserted in the resulting model documentation. Though not illustrated, in various embodiments, markdown cells 510 and/or code cells 520 may include metadata portions. For example, such metadata portions may include parameters regarding the execution of the content of the cell by the execution engine or the LaTeX or other type-setting system compiler.

Figure 6:
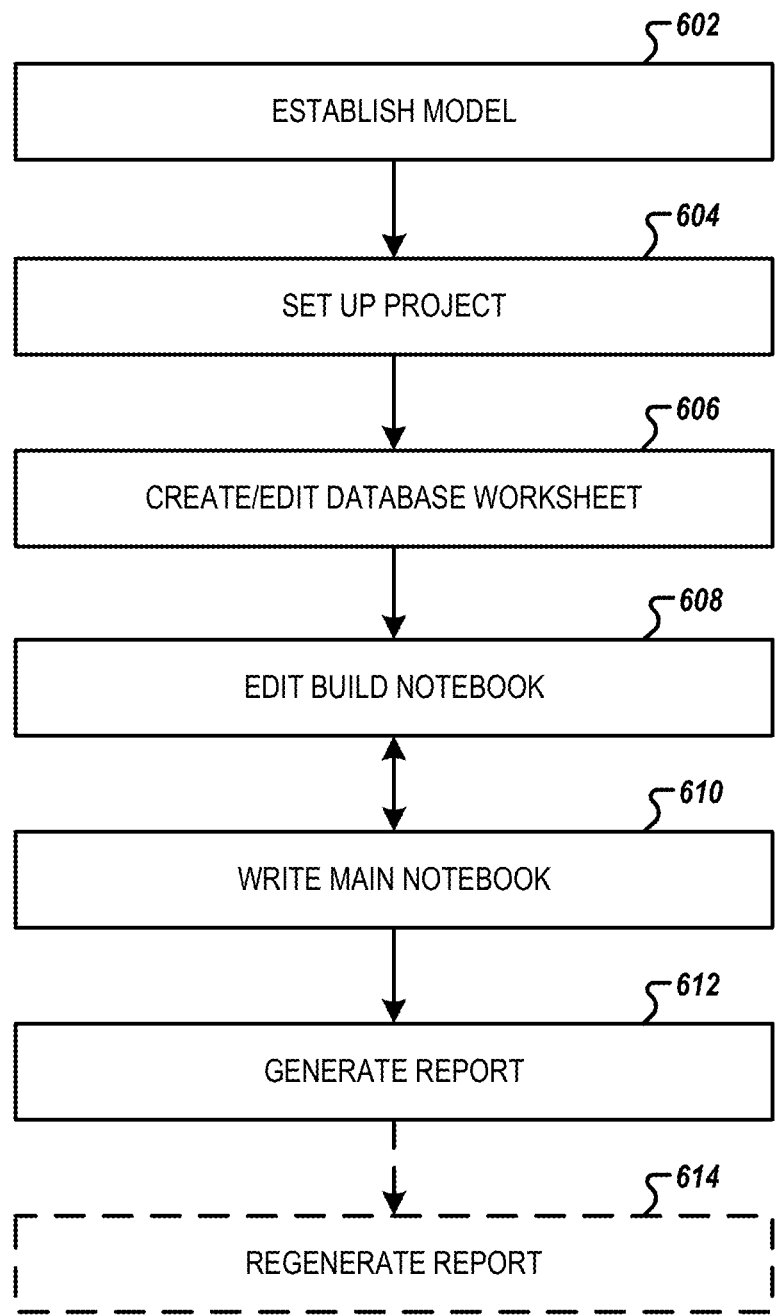
FIG. 6 is a flowchart illustrating operations performed, such as by a network device of FIG. 2 or a user computing device of FIG. 3 to provide a validation report, in accordance with an example embodiment described herein.

FIG. 6 is a flowchart illustrating operations performed, such as by a network device 10 or a user computing device 20 to provide a model documentation, in accordance with an example embodiment. Starting at step/operation 602, a model is established. For example, a model may be built, generated, created, and/or the like. For example, a user may operate a user computing device 20 (e.g., via input-output circuitry 28) to generate one or more executable code portions that, when executed by a processor (e.g., processor 12, 22) generate one or more predictions, analysis results and/or the like based on a model (e.g., a qualitative and/or quantitative model). In various embodiments, details and/or aspects of the model may depend on the model type and/or details of the particular model. In various embodiments, the model is associated with a model identifier (e.g., an alphanumeric string and/or the like) configured to identify the model.

At step/operation 604, a project is set up. For example, a user may operate a user computing device 20 (e.g., via input-output circuitry 28) to cause the processor 22 and/or memory 24 to generate a project corresponding to the model. For example, generating a project may comprise selecting a template 452, a model type that may be used for making an automated template selection, and/or information/data corresponding to a model (e.g., the associated model identifier) that may be used for making an automated template selection based on a corresponding model type. In an example embodiment, the input selecting the template 452 may comprise a user operating a user computing device 20 to save a template file storing the selected template 452 to a particular location (e.g., within a project folder) and/or providing a pathname/filename to the location of the selected template 452. In various embodiments, setting up a project may comprise generating and/or initiating one or more notebooks of the project. For example, the one or more notebooks may comprise a build notebook configured for providing, receiving, storing, containing, and/or defining parameters 462 and/or configuration input 464. For example, the one or more notebooks may comprise a main notebook configured for receiving, storing, and/or containing content to be included in the model documentation.

At step/operation 606, a database worksheet may be generated, created, and/or edited. For example, the user computing device 20 (and/or the network device 10) may create, generate, and/or edit a worksheet based on a database (e.g., stored in memory 14, 24) comprising information/data relating to the model, results generated based at least in part on the model, and/or the like. For example, the database may comprise results of executing one or more validation tests of the model and/or information/data corresponding to the model. For example, the database may comprise information/data identifying documents documenting and/or comprising information/data regarding generation, development, and/or the like of the model. In various embodiments, information/data in the database worksheet may be incorporated into the model documentation and/or used to extract and/or access information/data (e.g., from documentation corresponding to the model) to be incorporated into the model documentation upon execution of the project by the controller layer 460. In an example embodiment, a user may interact with the database worksheet via an IUI of the code-text platform.

In various embodiments, in order to generate the database worksheet, a user (e.g., via input-output circuitry 28 of a user computing device 20) provides information identifying the model. In various embodiments, the information identifying the model may include a model identification label or number, a model type, and/or the like. The user computing device 20 and/or network device 10 may execute executable code (e.g., python, java, C++ code) of the controller layer 460 fetches, gets, and/or accesses the information/data for populating the database worksheet from one or more databases 480. The model documentation may incorporate and/or include parts of this information/data directly and/or may include an assessment (e.g., how this information/data impacts the model, results of the model, functioning/operation of the model, and/or the like) of the information/data. In various embodiments, generating the database worksheet includes converting the information/data fetched, gotten, and/or accessed from the database 480 into a worksheet format. In various embodiments, the worksheet format is and/or is generated through execution and/or processing of a document of the code-text platform (e.g., a Jupyter notebook). For example, a executable code portion may be executed (e.g., by processor 12, 22 to convert the information/data fetched, gotten, and/or accessed from the database 480 into a worksheet format. In various embodiments, the worksheet format comprises text or other information/data fetched, gotten, and/or accessed from the database 480. In various embodiments, the worksheet format comprises text that is added by a user (e.g., via interaction with input-output circuitry 28 of the user computing device 20). In an example, embodiment, a user (e.g., interacting with input-output circuitry 28 of the user computing device 20) may add additional information/data to the worksheet, such as assessment, and provides input causing execution of the database worksheet (e.g., a code-text platform notebook comprising the database worksheet) to store the database worksheet to a meta-store. In an example embodiment, the meta-store is a database of comprising components (e.g., document fragments, the database worksheet, and/or the like) for the model documentation. In various embodiments, during the report generation (e.g., at step/operation 612) the execution engine executes controller code to place various aspects of the information/data and/or text in the database worksheet into various graphical representations (e.g., tables, graphs, text, and/or the like) in the appropriate sections/regions of the model documentation.

At step/operation 608, a build notebook corresponding to the project is edited. In various embodiments, the build notebook defines the workflow performed when the project is executed to generate the model documentation. For example, a user operating a user computing device 20 (e.g., via input-output circuitry 28) may edit a build notebook generated and/or initiated as part of a project corresponding to a model. In various embodiments, the build notebook may comprise parameters 462, configuration input 464, a template 452 selection (and/or information/data used to make template selection such as a model type), identification of a database worksheet, and/or the like. For example, a user operating a user computing device 20 may edit a build notebook to include appropriate content and/or identifiers of parameters 462, configuration input 464, a template selection 452 (and/or information/data used to make template selection such as a model type), identification of a database worksheet, and/or the like. In an example embodiment, a user may generate and/or edit a build notebook via an IUI of the code-text platform.

At step/operation 610, a main notebook may be edited, written, and/or the like. For example, a user operating a user computing device 20 (e.g., via input-output circuitry 28) may edit, write, and/or the like a main notebook of a project corresponding to the model. For example, the main notebook may comprise content and/or identifiers of content to be included in the model documentation. For example, a user may operate a user computing device 20 to provide content (and/or metadata) to one or more cells (e.g., 510, 520, 530) within a notebook of the code-text platform. In various embodiments, the steps/operations 608 and 610 may be performed in an iterative manner and/or concurrent manner. For example, one or more users (e.g., operating respective user computing devices 20) may update and/or edit the build notebook and write and/or edit the main notebook at least semi-concurrently, iteratively, and/or the like.

In various embodiments, the build notebook, main notebook, database worksheet, and/or the like allow a user to add content to be incorporated into the model documentation. In various embodiments, the content may be text (e.g., markdown text) to add narrative for the model documentation, executable code that generates python objects which could be represented as tables, charts, graphs, equations, and/or the like in the model documentation, artifacts, such as issues, limitations, restrictions, and/or the like associated with a model and/or one or more model tests that were and/or are to be executed on the model, and/or the like. In an example embodiment, the IUI components embedded within the code-text platform ask the user a series of questions (e.g., via input-output circuitry 28) and the user provides responses to the questions (e.g., via interaction with the input-output circuitry 28). Executable code corresponding to the IUI components may then generated standard text based on the responses provided by the user.

In various embodiments, the build notebook allows a variety of necessary elements, artifacts, and/or the like to be populated in a single location and committed to an internal and/or project specific database (e.g., the meta-store). In an example embodiment, the build notebook and/or template comprises executable code configured to, when executed (e.g., by processor 22), automatically places/presents the elements, artifacts, and/or the like defined in the build notebook into appropriate sections of the model documentation. For example, the elements, artifacts, and/or the like may be accessed from the internal and/or project specific database (e.g., the meta-store) and incorporated into the intermediary file and/or model documentation at the appropriate locations (e.g., as indicated by the template). For example, a user (e.g., via input-output circuitry 28 of a user computing device 20) may provide and/or define one or more artifacts necessary for the model documentation and/or the template may indicate one or more artifacts to be extracted (e.g., from one or more documents corresponding to the model, one or more documents corresponding to rules and/or regulations that are applicable to the model and/or an application thereof, and/or the like) for use in the model documentation. As used herein, an artifact may be a file; portion of a file; content (e.g., text, graphic/graph, table, and/or the like) contained in a file, portion of a file, and/or one or more cells of a notebook of the project; and/or the like.

At step/operation 612, a model documentation is generated. For example, a user may provide input (e.g., via input-output circuitry 28 of a user computing device 20) that triggers the execution of a project to generate a model documentation. For example, a user (e.g., operating the user computing device 20) may select a "run" or "execute" interface element and/or button in the IUI of the code-text platform. For example, one or more notebooks of the project (e.g., the build notebook, the main notebook, the database worksheet, and/or other notebooks such as a reference notebook (a .bib document)) may be executed by the kernel of the code-text platform (e.g., via the execution engine of the controller layer 460).

In an example embodiment, the execution engine may cause executable code of the one or more notebooks of the project to be executed to generate an intermediary file encoding the output and/or results of executing the one or more notebooks of the project in a format corresponding to the type-setting system. For example, the output and/or result of executing the one or more notebooks may be a .tex file comprising LaTeX encoded content when the type-setting system is LaTeX. For example, the template used to generate the one or more notebooks of the project may include executable code (that is then populated into the one or more notebooks of the project) that causes various components to be incorporated into the appropriate locations within the intermediary file (and the resulting model documentation). For example, executing the one or more notebooks of the project may cause a model test to be executed on the model and various graphical representations (e.g., tables, graphs, text, and/or the like) representing and/or summarizing the results of the model test. A first graphical representation representing and/or summarizing the results of the model test may be incorporated into a first section of the intermediary file and/or model documentation, a second graphical representation representing and/or summarizing the results of the model test (and being different from the first graphical representation) may be incorporated into a second section of the intermediary file and/or model documentation, in accordance with the associated template. In various embodiments, various elements (e.g., equations graphical representations, extracted portions of documents, user provided content, and/or the like) may be cross-referenced in various sections of the resulting model documentation. When the executable code is of the template is executed, various cross-references to various elements may be resolved such that the intermediary file encodes appropriate cross-references that cause the indicated elements to be properly incorporated and/or referenced in various sections of the resulting model documentation.

The intermediary file generated through execution of the one or more notebooks of the project and any cells and/or other documents (e.g., a .bib document identifying references related to the model) may then be processed and/or executed by a LaTeX or other type-setting system compiler and/or other processing engine to generate a model documentation. For example, execution of the one or more notebooks of the project may cause one or more model tests corresponding to the model to be executed, one or more graphical representations of the results of executing one or more model tests to be generated, and/or the like. The graphical representations may then be incorporated into the model documentation via execution of the one or more notebooks by the kernel of the code-text platform and/or by the controller layer 460 (e.g., an execution engine and/or a LaTeX or other type-setting system compiler). In various embodiments, execution of the one or more notebooks of the project causes a model documentation having the layout and/or format indicated by the selected template 452 to be generated having the content of the main notebook and/or other component corresponding to the model layer 410. The model documentation may then be stored in memory (e.g., memory 14, 24) and/or provided via input/output circuitry 18, 28. For example, the model documentation may be displayed via the input-output circuitry 18, 28.

In various embodiments, the report may be regenerated at step/operation 614. For example, a report identical to the previously generated report may be generated (although with a different time stamp). In another example, the parameters 462, configuration input 464, and/or template 452 may be modified and a model documentation having a different look and/or feel (e.g., different layout, different formatting, sections organized in a different manner, different graphical representations of model test results, and/or the like) may be generated. For example, a user may provide input (e.g., via input-output circuitry 28 of a user computing device 20) that triggers the execution of a project to regenerate model documentation. For example, one or more notebooks of the project (e.g., the build notebook, the main notebook, and/or other notebooks such as a reference notebook (e.g., a .bib document)) may be re-executed by the kernel of the code-text platform (e.g., by the execution engine). The results of re-executing the one or more notebooks of the project and any cells and/or other documents (e.g., a .bib document identifying references related to the model) may then be processed and/or executed by a type-setting system compiler (e.g., a LaTeX compiler) and/or other processing engine to re-generate a model documentation.

Figure 7:
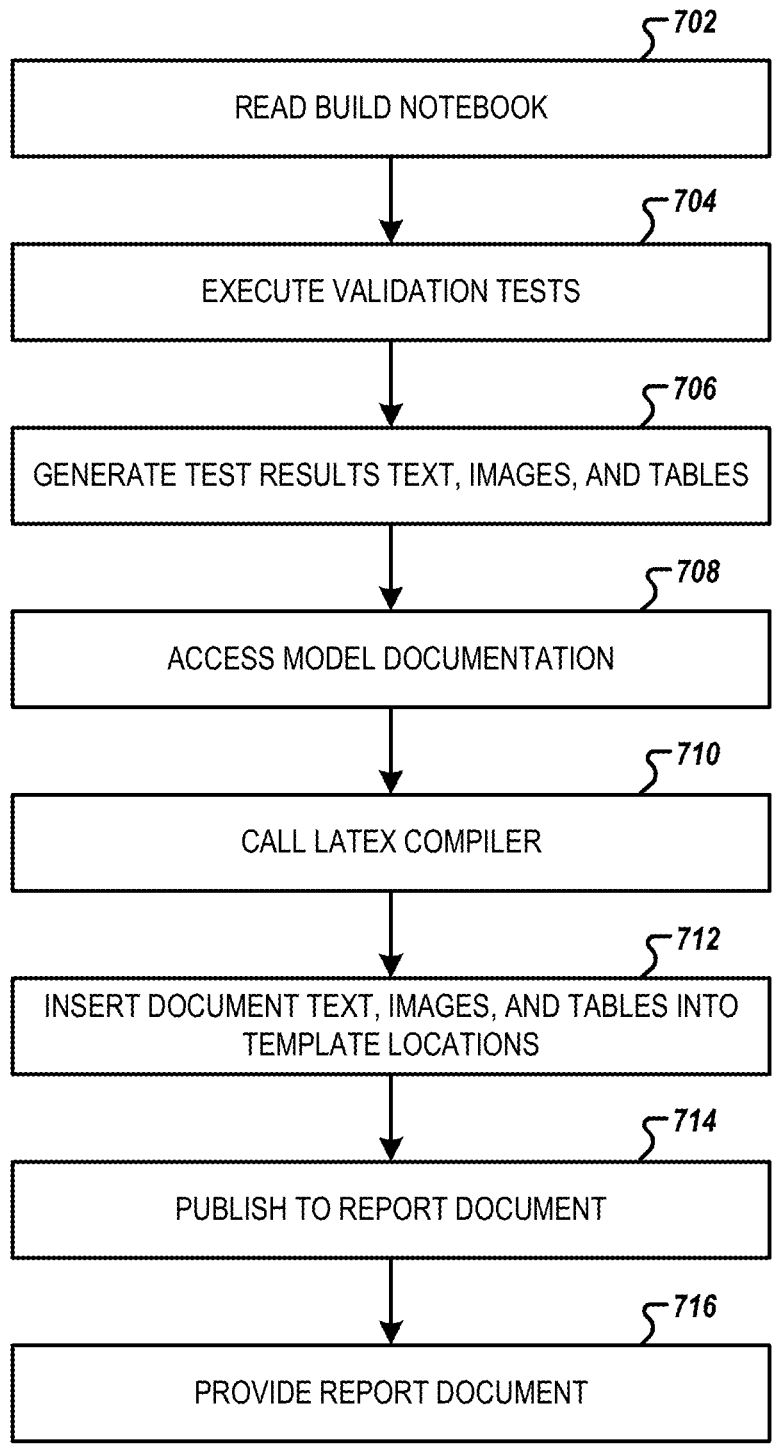
FIG. 7 is a flowchart illustrating operations performed, such as by a network device of FIG. 2 or a user computing device of FIG. 3 to provide a validation report, in accordance with an example embodiment described herein.

FIG. 7 is a flowchart illustrating operations performed, such as by a network device 10 or a user computing device 20 to provide a model documentation, in accordance with an example embodiment described herein. For example, an execution engine of the controller layer 460 operating on a network device 10 and/or a user computing device 20 may perform one or more steps/operations/processes illustrated in FIG. 7. For example, the operations, processes, and/or procedures illustrated in FIG. 7 may be complete as part of step/operation 612 and/or 614. In various embodiments, the steps/operations/procedures/processes illustrated in FIG. 7 may be executed in an automated manner. In various embodiments, the automated execution of the steps/operations/procedures/processes illustrated in FIG. 7 corresponds to the at least semi-automated generation of the model documentation.

Starting at step/operation 702, a build notebook, main notebook, database worksheet, and/or other notebooks of a project corresponding to a model are read (including the selected template 452, in an example embodiment). For example, user computing device 20 and/or network device 10 may read a build notebook, main notebook, database worksheet, and/or other notebooks of a project corresponding to a model. In various embodiments, the build notebook and/or other notebooks of the project may be executed by a kernel of the code-text platform. For example, any Python, Java, C++, and/or other executable code present in the build notebook, main notebook, database worksheet, and/or other notebooks of the project and supported by a kernel of the code-text platform maybe executed (e.g., by a kernel of the code-text platform). For example, the user computing device 20 and/or network device 10 may execute any code present in the build notebook, main notebook, database worksheet, and/or other notebooks of the project corresponding to the model and supported by a kernel of the code-text platform (e.g., via the kernel of the code-text platform).

For example, as described above with respect to FIG. 6, one or more users (e.g., interacting with input-output circuitry 28 of respective user computing devices 20) may generate a project (e.g., comprising one or more notebooks of a code-text platform) for a generating model documentation. The one or more notebooks may then be read at step/operation 702. For example, a user (e.g., interacting with input-output circuitry 28) may use a code-text platform to define a project comprising a build notebook, main notebook, database worksheet, and/or other notebooks to define content including text, tables, graphs, equations, and/or the like. In various embodiments, the content is defined using defined constructs like markdown for text, pandas dataframe for tables, images for plots, and/or the like. In various embodiments, a user (e.g., interacting with input-output circuitry 28) may define validation specific artifacts and/or model test specific artifacts such as findings, limitations, restrictions, and/or the like for the model. For example, a user (e.g., via input-output circuitry 28) may provide input inserted into the database worksheet which comprises additional artifacts (e.g., information/data and/or text) for use in the model documentation. When executable code of the controller layer 460 (e.g., execution engine, type-setting system compiler, and/or the like) is executed to generate the model documentation, content and artifacts (e.g., graphical representations of model test results; text-based descriptions of model tests and/or various aspects of the model; user provided and/or user defined content; information/data and/or text from the database worksheet; information/data, text, figures, tables, and/or the like extracted from one or more documents pertaining to the model, and/or the like) are assembled into the model documentation. For example, the controller layer 460 may use configuration input 464 to apply presentation templates to all content and/or artifacts such that an intermediate format (e.g., .tex) file is generated. The type-setting system compiler may then execute, process and/or convert the intermediate format file into a publishable model documentation (e.g., a PDF format file). Continuing with FIG. 7, at step/operation 704, one or more model tests are executed. For example, execution of the build notebook, main notebook, database worksheet, and/or other notebooks of a project corresponding to the model and/or user input (e.g., provided via input-output circuitry 18, 28) may cause one or more model tests to be executed. In various embodiments, the model tests executed may be determined based on a model type corresponding to the model. For example, the network device 10 and/or user computing device 20 may execute one or more model tests. For example, the execution of one or more model tests may generate test results. In various embodiments, the model tests executed are determined based on information/data read from the build notebook, main notebook, database worksheet, and/or other notebook of the project.

At step/operation 706, one or more graphical representations of the test results may be generated. For example, the network device 10 and/or user computing device 20 may generate one or more graphical representations of the test results generated by executing one or more model tests. In an example embodiment, the graphical representations generated may be determined based on the template 452 indicated by the build notebook and/or a template 452 indicated by a model type indicated in the build notebook. In an example embodiment, the graphical representations generated may be determined based on presentation templates of the presentation and automation modules 448. In various embodiments, the graphical representations comprise graphs, tables, text summarizing and/or describing the test results (e.g., generated by a natural language processing engine and/or the like), and/or the like. For example, one or more data points generated as part of the test results may be plotted in a graph, listed in a table, and/or described in text. In various embodiments, various libraries may be accessed (e.g., via application programming interface (API) calls and/or via other methods) as part of generating the graphical representations based on the template 452, parameters 462, presentation and automation modules 448, and/or configuration input 464.

At step/operation 708, documentation corresponding to the model may be accessed. For example, a database 480 may store one or more documents corresponding to model generation, model use or operation, and/or the like. A network device 10 and/or user computing device 20 may access such documentation and extract one or more portions of the documentation (e.g., tables, figures, references, text, and/or the like). For example, one or more portions of documents that document the generation, use cases, results, and/or other information/data corresponding to a model may be accessed and/or extracted. In an example embodiment, the documents and/or portions thereof that are accessed and/or extracted may be determined based on the selected template 452, the presentation and automation modules 448, the regulatory and/or validation measures 432, and/or the like.

As a result of performing steps/operations 702-708, an intermediary file is generated. In various embodiments, the intermediary file comprises cross-references to various elements (e.g., equations, graphical representations, extraction portions of documentation, user provided content, and/or the like) to be included in the model documentation. In various embodiments, the intermediary file is a type-setting system encoded version of the model documentation. For example, when the type-setting system is LaTeX, the intermediary file may be a .tex file that, when executed by a LaTeX compiler, causes the model documentation to be generated, published, and/or the like.

A step/operation 710, the project is passed to a type-setting system compiler (e.g., a LaTeX compiler) or other compiler. In an example embodiment, the intermediary file is accessed by the type-setting system compiler in an automated manner (e.g., without the user having to provide further input after initiating the execution engine at step/operation 702). In an example embodiment, a user provides input (e.g., via input-output circuitry 28) that causes the intermediary file to be provided to the type-setting system compiler. For example, the network device 10 and/or user computing device 20 may cause (a) the intermediary file; (b) information/data, figures, text, tables, references, and/or the like extracted for the documentation corresponding to the model; (c) graphical representations of the test results; and/or the like, to be passed to and/or accessed by a type-setting system compiler (e.g., LaTeX compiler) and/or other compiler. The type-setting system compiler (e.g., LaTeX compiler) and/or other compiler may read (a) the intermediary file; (b) information/data, figures, text, tables, references, and/or the like extracted for the documentation corresponding to the model; (c) graphical representations of the test results; and/or the like, and compile the same into a document at step/operation 712. For example, the type-setting system compiler (e.g., LaTeX compiler) and/or other compiler may generate a model documentation based on (a) the intermediary file; (b) information/data, figures, text, tables, references, and/or the like extracted from the documentation corresponding to the model; (c) graphical representations of the test results; and/or the like based on the template 452. In various embodiments, the model documentation is a file having a portable document format (pdf) and/or other printable/displayable file format. For example, based on processing (a) the results of executing the project (e.g., build notebook, main notebook, database worksheet, and/or one or more other notebooks of the project) by a kernel of the code-text compiler (e.g., execution engine); (b) information/data, figures, text, tables, references, and/or the like extracted for the documentation corresponding to the model; (c) graphical representations of the test results; and/or the like, the type-setting system compiler (e.g., LaTeX compiler) or other compiler may generate a file comprising the model documentation. The model documentation may be assembled based on and/or in accordance with the build notebook and/or other notebooks of the project, generated graphical representations, accessed documents and/or extracted document portions, template 452, parameters 462, and/or configuration input 464. In various embodiments, various libraries may be accessed via interfaces 442 (e.g., via application programming interface (API) calls and/or via other methods) as part of assembling the model documentation based on the build notebook, main notebook, database worksheet, and/or other notebooks of the project, generated graphical representations, accessed documents and/or extracted document portions, template 452, parameters 462, and/or configuration input 464. For example, the type-setting system (e.g., LaTeX) compiler and/or other compiler may publish a model documentation document/file. The file comprising the model documentation may then be stored to memory 14, 24.

At step/operation 716, the model documentation may be provided. For example, the network device 10 may provide (e.g., via communications interface 16) and/or the user computing device 20 may provide (e.g., via input-output circuitry 28) the model documentation. For example, the model documentation may be displayed via a monitor associated with the user computing device 20, provided via an electronic communication (e.g., email, notification, and/or the like) and/or otherwise provided for user review. Thus, in various embodiments, a model documentation may be generated using a project comprising one or more notebooks of a code-text platform in a reproducible, at least semi-automated manner.

FIGS. 6 and 7 each illustrate flowcharts describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Technical Advantages

As these examples illustrate, example embodiments contemplated herein provide technical solutions that solve real-world problems faced in the generation and/or regeneration of model documentation. Traditional means for generating model documentation (e.g., model validation reports and/or the like) require significant amounts of human user time and effort that are not easily reproducible and may or may not result in model documentation that conforms to the current rules and/or regulations corresponding to the model. Moreover, manual generation of model documentation requires a combination of different types of documents, including word processing documents; code-text platform documents; manually generated figures, tables, and/or the like; regeneration of content corresponding to the document that has been previously generated (e.g., in other documents corresponding to the model); and/or the like. Thus, the manual generation of model documentations presents a variety of shortcomings.

Various embodiments provide technical solutions to the technical problem of being able to generate model documentation in an efficient, reproducible manner by generating the model documentation in an at least semi-automated manner. In particular, by using a code-text platform that has been augmented to include additional word processing functionality to store all of the information/data and/or indications of where information/data corresponding to the model are stored (e.g., in database 480 and/or in memory 14, 24), significant improvements are provided. For example, various graphical representations of the model test results may be generated and incorporated into the model documentation in an automated manner. Moreover, rework corresponding to information/data already documented in documentation corresponding to the model may be prevented, in various embodiments. Thus, the model documentation may be generated in a way that is easy to reproduce. Moreover, various versions (e.g., having various layouts, style formats, and/or the like) may be generated based on the same project (e.g., set of one or more notebooks of the code-text platform). Thus, various embodiments provide improvements to the technical field of validating models and generating model documentation.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating a model documentation in an at least semi-automated manner, the method comprising:
receiving, by an interactive user interface (IUI) via input-output circuitry of a user computing device, user input selecting or providing information used to select a template corresponding to a model;
processing, via a processor, the template to cause a build notebook to be generated, the build notebook comprising a plurality of cells, at least one cell of the plurality of cells comprising executable code in at least a first programming language;
receiving, via the input-output circuitry of the user computing device, user input populating at least a portion of the build notebook, the at least a portion of the build notebook comprising (a) a model identifier configured to identify the model and (b) one or more cells of the plurality of cells;
responsive to user input received via the input-output circuitry, executing, via the processor, the build notebook using an execution engine to cause an intermediary file to be generated that is encoded in a typesetting system, wherein executing the build notebook causes one or more cross-references of elements of the model documentation to be mapped to appropriate locations within the intermediary file, the elements comprising at least one of (a) one or more graphical representations of results of model tests executed on the model or (b) one or more extracted or user-defined artifacts required for the model documentation;

compiling, via the processor, the intermediary file using a type-setting system compiler to assemble user-provided text and the elements, in accordance with the template, to generate the model documentation; and causing the model documentation to be provided via input-output circuitry of the user computing device.

2. The method of claim 1, further comprising at least one of storing the model documentation in a memory of the user computing device or providing the model documentation via a communication circuitry of the user computing device.

3. The method of claim 1, further comprising receiving configuration input via user interaction with the input-output circuitry of the user computing device, wherein execution of the build notebook or compilation of the intermediary file is performed based at least in part on the configuration input.

4. The method of claim 1, wherein the IUI is provided via execution of a report generating program by the processor and the model documentation generating program has a model-view-controller architecture.

5. The method of claim 4, wherein a model layer of the model-view-controller architecture interfaces with at least one of a database storing information corresponding to the model or a validation test library.

6. The method of claim 4, wherein a view layer of the model-view-controller architecture is configured to generate the build notebook based on the template.

7. The method of claim 4, wherein a controller layer of the model-view-controller architecture comprises the execution engine, the execution engine being configured to cause a model documentation to be generated based on (a) parameters and configuration input, (b) a build notebook generated based on the template, and (c) content of a model layer of the model-view-controller architecture.

8. The method of claim 1, further comprising generating a database worksheet by querying a database comprising information corresponding to the model and extracting information corresponding to the model from the database to populate one or more fields of the database worksheet.

9. The method of claim 8, wherein execution of the build notebook comprises accessing information corresponding to the model from the database worksheet and generating a graphical representation of information corresponding to the model based thereon.

10. The method of claim 1, wherein the graphical representations of results of model tests executed on the model comprise one or more of graphs, tables, diagrams, or text describing the model tests or the results of the model tests executed on the model.

11. The method of claim 1, wherein the type-setting system compiler is a LaTeX compiler and the intermediary file is a .tex file.

12. The method of claim 11, wherein the build notebook comprises one or more raw cells storing LaTeX-encoded text.

13. The method of claim 1, wherein the template is configured to cause the model documentation to include one or more sections stipulated by rules or regulations corresponding to the model.

14. The method of claim 1, wherein the user input providing information used to select the template corresponding to the model comprises at least one of a model type or the model identifier and the processor automatically selects the template based on the at least one of the model type or the model identifier.

15. The method of claim 1, wherein the IUI is configured to enable incorporation of one or more text functions into the build notebook, the one or more text functions incorporated into a code-text platform providing the IUI as plug-ins.

16. The method of claim 1, wherein the build notebook comprises at least one markdown cell storing markdown text.

17. An apparatus for generating a model documentation in an at least semi-automated manner, the apparatus comprising:

processor circuitry configured to:

control an interactive user interface (IUI) provided via input-output circuitry of the apparatus to receive user input selecting or providing information used to select a template corresponding to a model;

process the template to cause a build notebook to be generated, the build notebook comprising a plurality of cells, at least one cell of the plurality of cells comprising executable code in at least a first programming language;

control the IUI to receive user input populating at least a portion of the build notebook, the at least a portion of the build notebook comprising (a) a model identifier configured to identify the model and (b) one or more cells of the plurality of cells;

responsive to user input received via the input-output circuitry, execute the build notebook using an execution engine to cause an intermediary file to be generated that is encoded in a type-setting system, wherein executing the build notebook causes one or more cross-references of elements of the model documentation to be mapped to appropriate locations within the intermediary file, the elements comprising at least one of (a) one or more graphical representations of results of model tests executed on the model or (b) one or more extracted or user-defined artifacts required for the model documentation;

compile the intermediary file using a type-setting system compiler to assemble user-provided text and the elements, in accordance with the template to generate the model documentation; and control the input-output circuitry to provide the model documentation.

18. The apparatus of claim 17 wherein the processor circuitry is further configured to generate a database worksheet by querying a database comprising information corresponding to the model and extracting information corresponding to the model from the database to populate one or more fields of the database worksheet.

19. The apparatus of claim 17, wherein the build notebook comprises at least one of (a) one or more raw cells storing LaTeX-encoded text, (b) one or more code cells storing the executable code, and (c) at least one markdown cell storing markdown text.

20. A computer program product for generating a model documentation in an at least semi-automated manner, the computer program product comprising at least one non-transitory computer-readable storage medium storing software instructions that, when executed, cause an apparatus to:

receive, by an interactive user interface (IUI), user input selecting or providing information used to select a template corresponding to a model;

process the template to cause a build notebook to be generated, the build notebook comprising a plurality of cells, at least one cell of the plurality of cells comprising executable code in at least a first programming language;

receive user input populating at least a portion of the build notebook, the at least a portion of the build notebook comprising (a) a model identifier configured to identify the model and (b) one or more cells of the plurality of cells;

responsive to receiving the user input, execute the build notebook using an execution engine to cause an intermediary file to be generated that is encoded in a type-setting system, wherein executing the build notebook causes one or more cross-references of elements of the model documentation to be mapped to appropriate locations within the intermediary file, the elements comprising at least one of (a) one or more graphical representations of results of model tests executed on the model or (b) one or more extracted or user-defined artifacts required for the model documentation;

compile the intermediary file using a type-setting system compiler to assemble user-provided text and the elements, in accordance with the template, to generate the model documentation; and cause the model documentation to be provided via input-output circuitry of the apparatus.

\* \* \* \* \*